T. GOLDE.
FOLDING TOP OF VEHICLES.
APPLICATION FILED APR. 1, 1911.
1,012,352.
Patented Dec. 19, 1911.
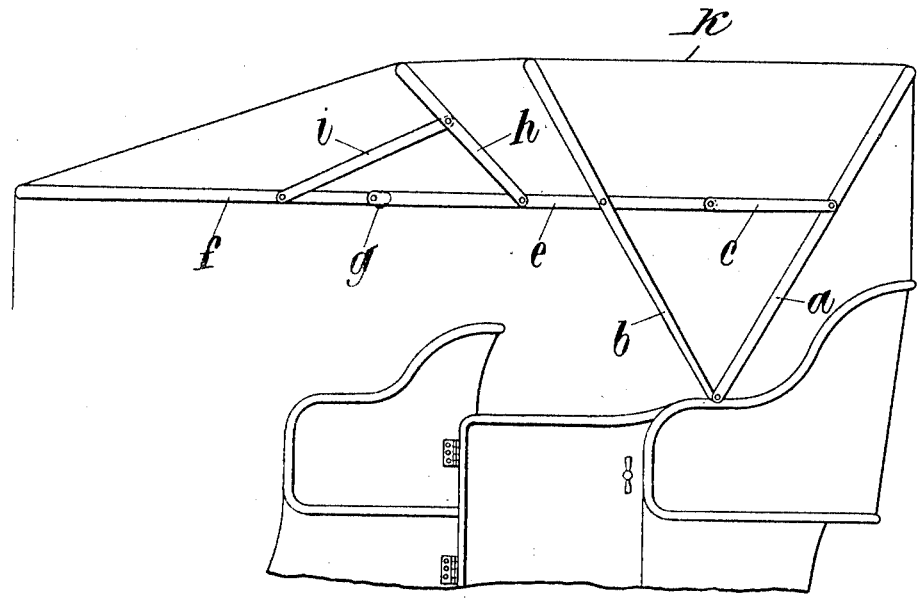
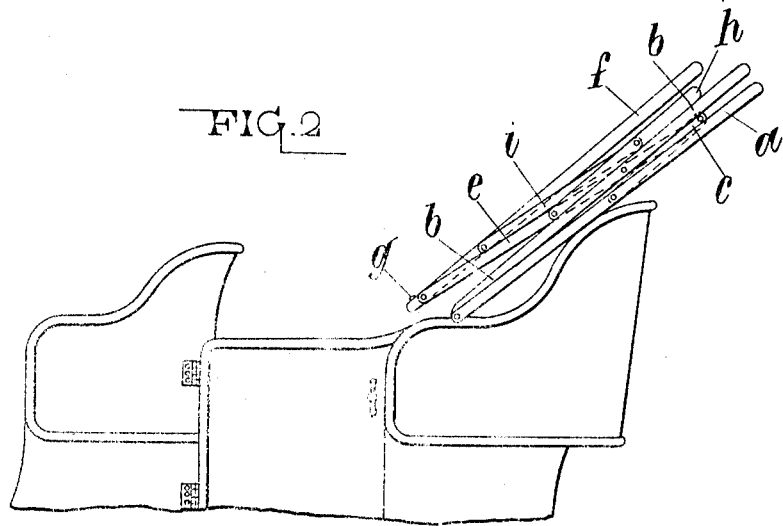

UNITED STATES PATENT OFFICE.

TRAUGOTT GOLDE, OF GERA, GERMANY.

FOLDING TOP OF VEHICLES.

1,012,352.   Specification of Letters Patent.   Patented Dec. 19, 1911.

Application filed April 1, 1911. Serial No. 618,399.

*To all whom it may concern:*

Be it known that I, TRAUGOTT GOLDE, a subject of the Emperor of Germany, residing at 14/16 Schülerstrasse, Gera-Reuss, in the Principality of Reuss, Germany, have invented certain new and useful Improvements in Folding Tops of Vehicles, of which the following is a specification, reference being had therein to the accompanying drawing.

The well known folding tops of vehicles have the disadvantage that owing to their bow or hoop system, they prevent, while putting up the folds, the free outlook of the passengers of the vehicle, and that it is impossible for the operator to let the top down while seated in the vehicle. This fault is obviated with the new top in so far as there is pivotally connected with the two principal- and layer-bows an auxiliary bow, situated horizontally, when the folds are put up and whereby an easy turning down of the top from the seat of the vehicle, as well as a free outlook are brought about.

The drawing represents such a top of a vehicle viz:

Figure 1 gives a side view of the top when the folds are extended while Fig. 2 shows the parts of the frame folded together and without a linen cover.

The rear bow $a$ and the main bow $b$ carry the weight of the whole cover, and are so fastened in the well known manner behind the door of entry at the sides of the coach as to be capable of turning and are, by means of rods $c$ so pivotally connected with the rods $e$ and the bow $f$ as to bring the rods $c$ and $e$, and the bow $f$ into a horizontal plane, when the top is in operative position, which situation is secured by a stop-hinge $g$ connecting the link $e$ to the bow $f$.

In order to strengthen and support the rods $e$ and the bow $f$, as well as for the support of the linen cover $k$ there are pivotally connected with the rods $e$ the auxiliary bow $h$ and the links $i$ which are also pivotally fastened one with another. By pushing the joint upward between the auxiliary bow $h$ and the rod $c$ the top can be easily folded down or put up from the seat of the vehicle.

Having described my invention what I claim and desire to secure is:

A foldable vehicle top comprising a rear bow whose ends are pivotally attached to the vehicle, a main bow having its ends pivotally attached to the vehicle, a horizontally disposed, articulated series of parts composed of rods $c$ and $e$, the rear ends of the rods $c$ being pivoted to the rear bow and their front ends being pivoted to the ends of rods $e$, said rods $e$ having pivotal connection rearwardly of their middle part with said main bow and a front bow whose ends connect by stop hinges with the front ends of the rods $e$; an auxiliary bow pivoted on rods $e$ forward of the main bow, links terminally pivoted to said front bow and said auxiliary bow, and a cover secured rearwardly to the vehicle and forwardly to the edges of said front bow, substantially as described.

In testimony whereof I affix my signature.

TRAUGOTT GOLDE.

In the presence of—
J. STEPHAN,
CHARLES NEUER.

---

Copies of this patent may be obtained for five cents each, by addressing the "Commissioner of Patents, Washington, D. C."